(12) United States Patent
Chamness (10) Patent No.: US 9,251,051 B2
(45) Date of Patent: Feb. 2, 2016

(54) CAPACITY FORECASTING FOR BACKUP STORAGE

(71) Applicant: EMC Corporation, Hopkinton, MA (US)

(72) Inventor: Mark Chamness, Menlo Park, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/714,726

(22) Filed: May 18, 2015

(65) Prior Publication Data

US 2015/0261665 A1 Sep. 17, 2015

Related U.S. Application Data

(63) Continuation of application No. 14/175,328, filed on Feb. 7, 2014, now Pat. No. 9,063,839, which is a continuation of application No. 13/334,479, filed on Dec. 22, 2011, now Pat. No. 8,688,927.

(51) Int. Cl.

| | |
|---|---|
| *G06F 12/00* | (2006.01) |
| *G06F 12/02* | (2006.01) |
| *G06F 11/14* | (2006.01) |
| *G06N 5/04* | (2006.01) |
| *G06F 3/06* | (2006.01) |
| *G06F 11/30* | (2006.01) |
| *G06F 11/34* | (2006.01) |

(52) U.S. Cl.
CPC ............... *G06F 12/023* (2013.01); *G06F 3/06* (2013.01); *G06F 3/0605* (2013.01); *G06F 3/065* (2013.01); *G06F 3/067* (2013.01); *G06F 11/1446* (2013.01); *G06F 11/1448* (2013.01); *G06F 11/1451* (2013.01); *G06F 11/1453* (2013.01); *G06F 11/3034* (2013.01); *G06F 11/3452* (2013.01); *G06F 12/00* (2013.01); *G06F 12/02* (2013.01); *G06N 5/048* (2013.01); *G06F 2201/84* (2013.01); *G06F 2212/1044* (2013.01)

(58) Field of Classification Search
CPC ............ G06F 11/1446; G06F 11/1448; G06F 11/1451; G06F 11/1453; G06F 12/00; G06F 12/023
See application file for complete search history.

(56) References Cited

U.S. PATENT DOCUMENTS

| | | | | |
|---|---|---|---|---|
| 2007/0198802 | A1* | 8/2007 | Kavuri | 711/170 |
| 2008/0244172 | A1* | 10/2008 | Kano | 711/112 |
| 2013/0166486 | A1* | 6/2013 | Kim | 706/46 |

OTHER PUBLICATIONS

Wikipedia, (Segmented Regression) [http://en.wikipedia.org/wiki/Segmented_regression], Jan. 2010, pp. 1-4.*
Chamness, (Capacity Forecasting in a Backup Storage Environment), EMC, Nov. 2011, pp. 1-9.*
Wikipedia, (Moving Average) [http://en.wikipedia.org/wiki/Moving_average], Feb. 2010, pp. 1-7.*
Wikipedia, (Coefficient of Determination) [http://en.wikipedia.org/wiki/Coefficient_of_determination], Feb. 2010, pp. 1-6.*

* cited by examiner

*Primary Examiner* — Shawn X Gu
(74) *Attorney, Agent, or Firm* — Van Pelt, Yi & James LLP (57) ABSTRACT

A system for capacity forecasting for backup storage comprises a processor and a memory. The processor is configured to determine a selected statistical analysis from the set of statistical analysis for subsets of a set of capacities at points in time; forecast a full capacity time based at least in part on the selected statistical analysis; and determine that the full capacity time is qualified. The memory is coupled to the processor and configured to provide the processor with instructions.

16 Claims, 10 Drawing Sheets

CAPACITY FORECASTING FOR BACKUP STORAGE

CROSS REFERENCE TO OTHER APPLICATIONS

This application is a continuation of U.S. patent application Ser. No. 14/175,328, now U.S. Pat. No. 9,063,839, entitled CAPACITY FORECASTING FOR BACKUP STORAGE filed Feb. 7, 2014 which is incorporated herein by reference for all purposes, which is a continuation of U.S. patent application Ser. No. 13/334,479, now U.S. Pat. No. 8,688,927, entitled CAPACITY FORECASTING FOR BACKUP STORAGE filed Dec. 22, 2011 which is incorporated herein by reference for all purposes.

BACKGROUND OF THE INVENTION

As the computing power of modern devices grows, more and more data is generated and must be stored. This data is commonly stored by a distributed storage system and backed up into a centralized backup storage system. At a given time the backup storage system has a fixed storage capacity, limited by the total capacity of its data storage devices. When the backup storage system reaches full capacity, additional storage devices are required to increase the capacity. However, while the system is waiting for the storage devices to be added, additional data cannot be stored in the backup storage system. Prevention of data loss requires additional storage devices to be acquired and added as fast as possible, incurring extra costs for the urgency involved.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Capacity forecasting for backup storage is disclosed. A system for capacity forecasting comprises a processor and a memory. The processor is configured to calculate a set of linear regressions for subsets of a set of capacities at points in time. The processor is further configured to determine a selected linear regression from the set of linear regressions. The processor is further configured to forecast a full capacity time based at least in part of the selected linear regression. The memory is coupled to the processor and configured to provide the processor with instructions.

Rather than waiting for a backup system to reach full capacity and then adding additional capacity in haste, the future date of full capacity is predicted so that additional capacity can be added in advance to prevent full capacity occurring. Additional capacity can then be added in a planned way at a reduced cost. A storage system administrator further has the option at that point of changing a backup strategy to reduce capacity usage (e.g., by storing further backups). In a smaller data storage system, this might be accomplished by a system administrator carefully watching the backup system capacity and manually deciding when capacity should be added. However, in a large data storage system comprising numerous backup systems, automatically predicting future capacities is necessary in order to avoid a system administrator losing track of a particular backup system and it unexpectedly reaching full capacity.

Automatically predicting future capacities is accomplished by performing linear regressions on historical data to determine the current usage behavior, and extrapolating the current behavior to the point in the future when system capacity is exhausted. An assumption is made that system usage is piecewise linear, e.g., for a given usage pattern, capacity changes linearly with time; periodically the usage pattern shifts, altering the slope of the linear capacity growth. The system for capacity forecasting determines the slope of the current usage pattern. Linear regressions are calculated on historical data sets of system capacity, gradually increasing the size of the data sets by adding points backwards in time from the present. While the data set is small enough to include only the current usage pattern, it will register a high R squared (e.g., goodness of fit, the coefficient of determination or $R^2$, etc.), indicating the usage pattern is roughly linear within that time interval, with R squared increasing as the data set grows longer. Once the data set includes a previous usage pattern, R squared decreases, indicating the nonlinearity. The most accurate prediction for the current usage pattern is the linear regression that produces the peak value of R squared. The slope of this linear regression indicates the slope of the current usage pattern and therefore the rate of data growth, which can be extrapolated to determine when full capacity will be reached, assuming the current behavior pattern does not change.

In some embodiments, the capacity forecasting is used to estimate the size required for new hardware. For example, after reaching full capacity next month, how much capacity is needed to accommodate the capacity needs for the next 12 months based on the current growth rate.

Figure 1:
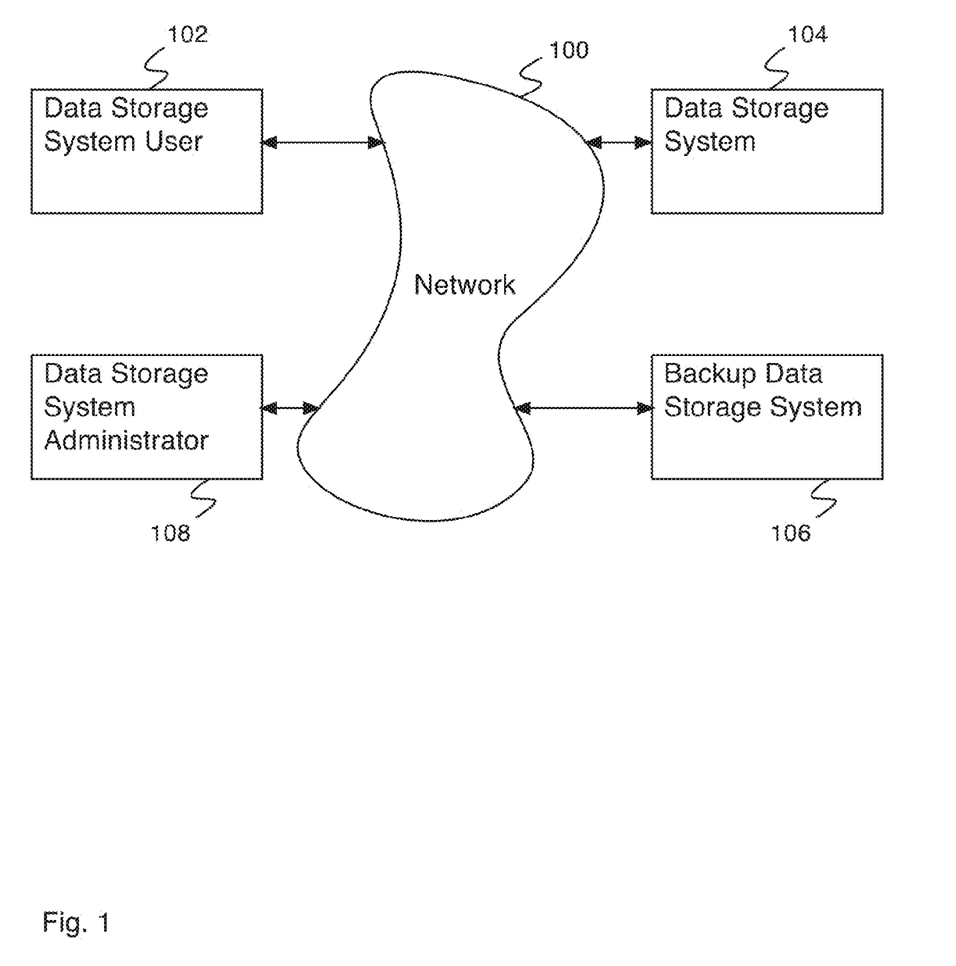
FIG. 1 is a block diagram illustrating an embodiment of a network system.

FIG. 1 is a block diagram illustrating an embodiment of a network system. In the example shown, the network system comprises data storage system user 102, data storage system administrator 104, data storage system 106, and backup data storage system 108 communicating via network 100. In various embodiments, network 100 comprises one or more of the following: a local area network, a wide area network, a wired network, a wireless network, the Internet, or any other appropriate network.

Data storage system user 102 comprises a data storage system user accessing data storage services on data storage system 104. In some embodiments, data storage system user 102 comprises an employee at a company utilizing a data storage system. In some embodiments, data storage user 102 comprises an employee at a company purchasing data storage system services. In various embodiments, there are 1, 2, 4, 13, 22, 115, or any other appropriate number of users accessing data storage services on data storage system 104. In some embodiments, each data storage system user only has access to their own data stored on data storage system 104 and is able to utilize data storage system 104 as though they are the sole data storage system user.

Data storage system 104 comprises a data storage system for storage and retrieval of information. In some embodiments, data storage system 104 comprises a distributed data storage system, e.g., a data storage system comprising multiple computers not necessarily in the same location. In some embodiments, data storage system 104 comprises a system for processing information. In some embodiments, data storage system 104 comprises a storage system optimized to efficiently store uncompressed files. In some embodiments, data storage system 104 comprises a deduplicating storage system. Backup data storage system 106 comprises a backup system for backing up data storage system 104. In some embodiments, backup data storage system 106 comprises a system for storing the state of data storage system 104 at various points in time. In some embodiments, backup data storage system 106 stores the state of data storage system 104 at regular intervals. In various embodiments, regular intervals comprise every hour, every day, three times a week, once a week, once a month, or any other appropriate interval. In some embodiments, each time backup data storage system 106 stores the state of data storage system 104, it creates a full backup (e.g., a complete copy of the data stored in data storage system 104). In some embodiments, backup data storage system 106 creates some full backups and some incremental backups (e.g., copies of the changes made to data storage system 104 since the last backup made). In some embodiments, backup data storage system 106 comprises a deduplicating storage system. In some embodiments, data storage system 104 and backup data storage system 106 each have a limited storage capacity (e.g., limited by how much physical storage capacity has been installed). In some embodiments, the storage capacities of data storage system 104 and backup data storage system 106 can be increased by installing additional physical storage capacity.

Data storage system administrator 108 comprises a data storage system administrator administrating data storage system 104 and backup data storage system 108. In some embodiments, data storage system administrator 108 ensures data storage system 104 and backup data storage system 106 are running properly. In some embodiments, data storage system administrator 108 ensures data storage system 104 and backup data storage system 106 do not run out of capacity. In some embodiments, data storage system administrator schedules the installation of additional capacity for data storage system 104 and backup data storage system 106 at appropriate times. In some embodiments, data storage system administrator schedules the installation of additional capacity for data storage system 104 and backup data storage system 106 according to a capacity forecast.

Figure 2:
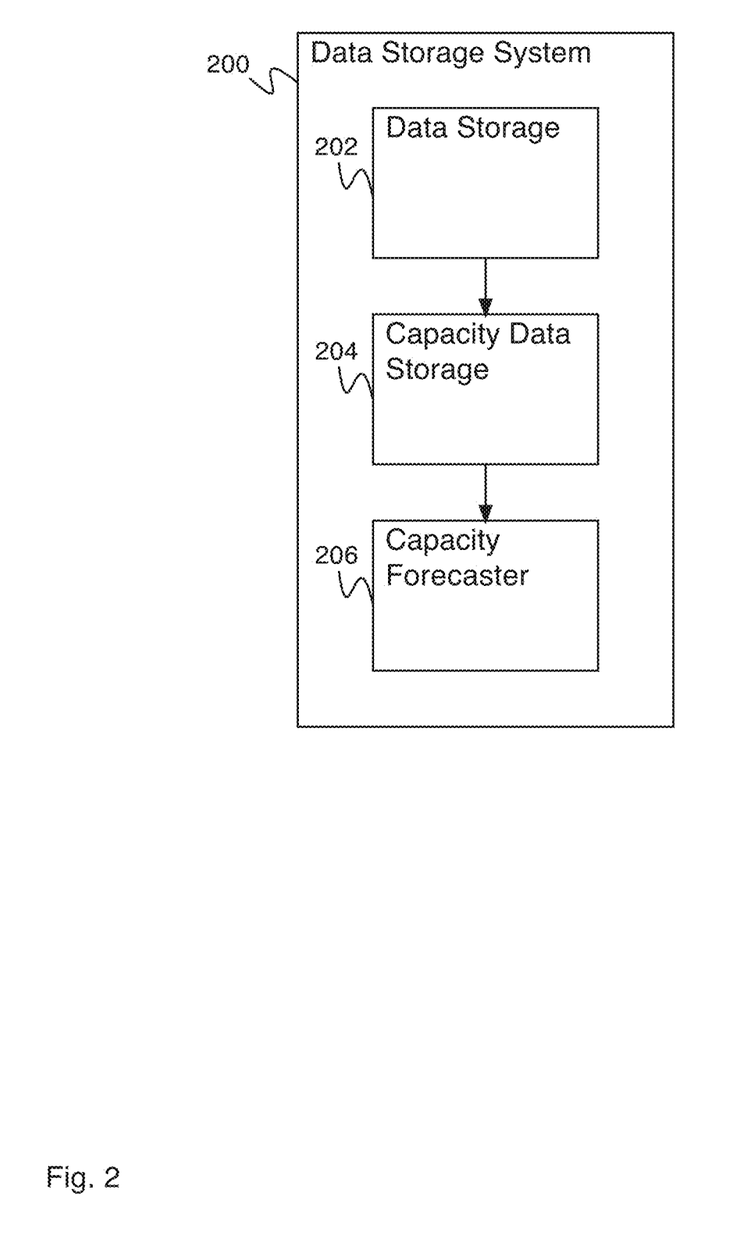
FIG. 2 is a block diagram illustrating an embodiment of a data storage system.

FIG. 2 is a block diagram illustrating an embodiment of a data storage system. In some embodiments, data storage system 200 comprises data storage system 104 of FIG. 1. In some embodiments, data storage system 200 comprises backup data storage system 106 of FIG. 1. In some embodiments, data storage system 200 comprises a system for capacity forecasting for backup storage. In the example shown, data storage system 200 comprises data storage 202. In various embodiments, data storage 202 comprises magnetic data storage, optical data storage, solid-state data storage, phase change data storage, or any other appropriate kind of data storage. In some embodiments, data storage 202 comprises one or more hard disk drives. In some embodiments, data storage 202 comprises a deduplicating data storage. In the example shown, data storage system 200 additionally comprises capacity data storage 204. Capacity data storage 204 comprises a system for storing data storage capacities. In some embodiments, capacity data storage 204 comprises a system for storing data storage capacities at points in time. In some embodiments, data storage capacities comprise information describing the amount of data that can be stored in a data storage and the amount of data that is currently stored in a data storage. In some embodiments, capacity data storage 204 stores the data storage capacities of data storage 202. In some embodiments, capacity data storage 204 stores data storage capacities of data storage 202 at regular intervals (e.g., every hour, every day, every other day, every week, etc.). In some embodiments, capacity data storage 204 stores data storage capacities of data storage 202 associated with the point in time when the data storage capacity measurement was made. In some embodiments, points in time comprise days in the past. In some embodiments, capacity data storage 204 stores deduplicating system capacities.

In the example shown, data storage system 200 additionally comprises capacity forecaster 206. In some embodiments, capacity forecaster 206 comprises a system for predicting the capacity of a data storage (e.g., data storage 202). In some embodiments, capacity forecaster 206 comprises a system for predicting when a data storage will reach full capacity. In some embodiments, capacity forecaster 206 receives a set of data storage capacities (e.g., data storage capacities stored in capacity data storage 204). In some embodiments, capacity forecaster 206 uses a set of data storage capacities as part of predicting when a data storage will reach full capacity. In some embodiments, capacity forecaster 206 comprises a processor and a memory. The processor is configured to calculate a set of linear regressions for subsets of a set of capacities at points in time. The processor is further configured to determine a selected linear regression from the set of linear regressions. The processor is further configured to forecast a full capacity time based at least in part on the selected linear regression. The memory is coupled to the processor and configured to provide the processor with instructions. In some embodiments, capacity forecaster 206 exists as a software module executing on computer accessed by a data storage system administrator (e.g., data storage system administrator 108 of FIG. 1). In some embodiments, capacity data storage 204 exists as part of a software module including capacity forecaster 206. In some embodiments, capacity forecaster 206 exists as a standalone system communicating with a data storage system administrator (e.g., data storage system administrator 108 of FIG. 1) and a data storage system (e.g., data storage system 104 of FIG. 1) via a network (e.g., network 100 of FIG. 1). In some embodiments, capacity data storage 204 exists as part of a standalone system including capacity forecaster 206.

Figure 3A:
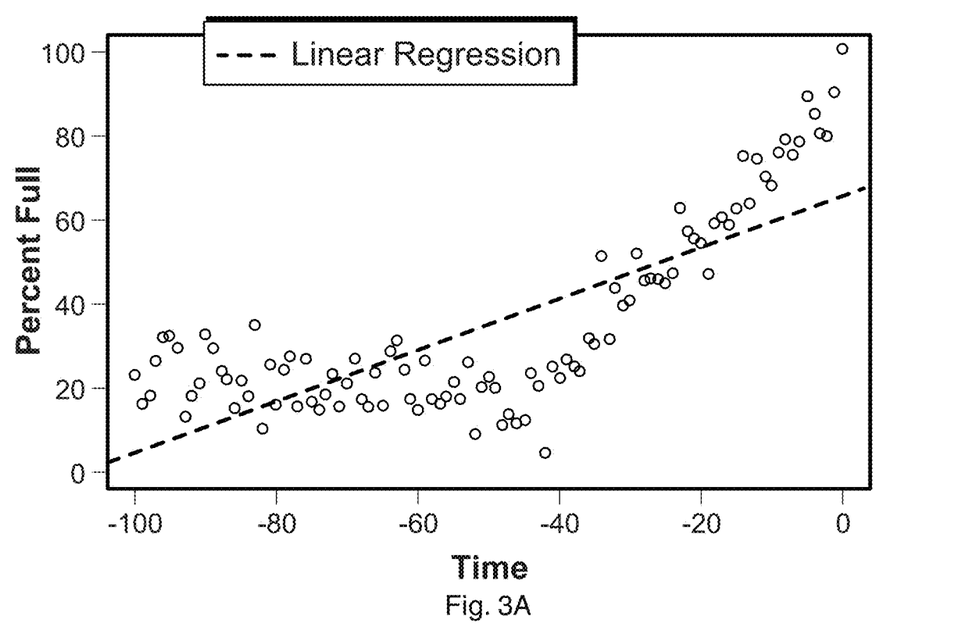
FIG. 3A is a diagram illustrating an embodiment of a linear regression.

FIG. 3A is a diagram illustrating an embodiment of a linear regression. In the example shown, the diagram of FIG. 3A shows a set of capacities (e.g., data storage capacities stored in capacity data storage 204 of FIG. 2). In some embodiments, capacities represent the used capacities of a data storage (e.g., data storage 202 of FIG. 2). In the example shown, the used capacities of FIG. 3A exhibit a noisy piecewise linear behavior. In some embodiments, noisy behavior comprises behavior with random day-to-day fluctuations. In some embodiments, noisy behavior comprises behavior with random day-to-day fluctuations superimposed on a characteristic function. In various embodiments, the characteristic function changes linearly, quadratically, exponentially, or in any other appropriate way. In the example shown, the characteristic function comprises a piecewise linear function. In some embodiments, a piecewise linear function comprises a function that exhibits linear behavior which occasionally changes slope (e.g., a linear function that has a first slope over a first time period, a second slope over a second time period, a third slope over a third time period, etc.). In the example shown, the characteristic function exhibits a slope of approximately 0 percent full per time unit over the time period marked −100 to −40, and a slope of approximately 2 percent full per time unit over the time period marked −40 to 0.

FIG. 3A additionally shows a linear regression over the used capacity data. In the example shown, the linear regression is computed over the entire data set, e.g., over the time period marked −100 to 0. In some embodiments, a linear regression comprises a linear fit to a data set, e.g., the line that most accurately fits the data set. In the example shown, the data set exhibits nonlinear behavior over the time period −100 to 0 (e.g., due to the change in slope at time −40), and thus the best linear fit to the entire set of data is a poor model for the more recent data. In the example shown, the linear regression shows a significantly different slope from the true function at time equals 0 (e.g., present time), thus it is a poor predictor of when the capacity will be exhausted (e.g., percent full reaches 100).

Figure 3B:
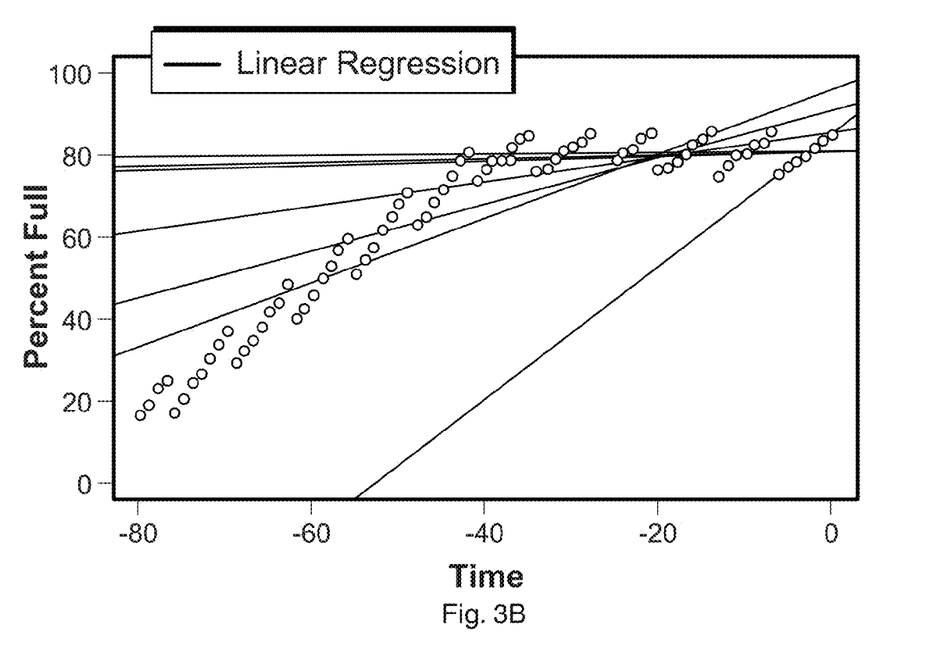
FIG. 3B is a diagram illustrating an embodiment of linear regressions.

FIG. 3B is a diagram illustrating an embodiment of linear regressions. In the example shown, the dots represent used capacities at times from today to 80 days prior to today. The lines show a series of linear regressions that include subsets of used capacity data of different sizes stretching back from today. As can be seen, depending on the size of the subset of data, the regression may or may not be a good predictor of a future capacity used in the system.

Figure 3C:
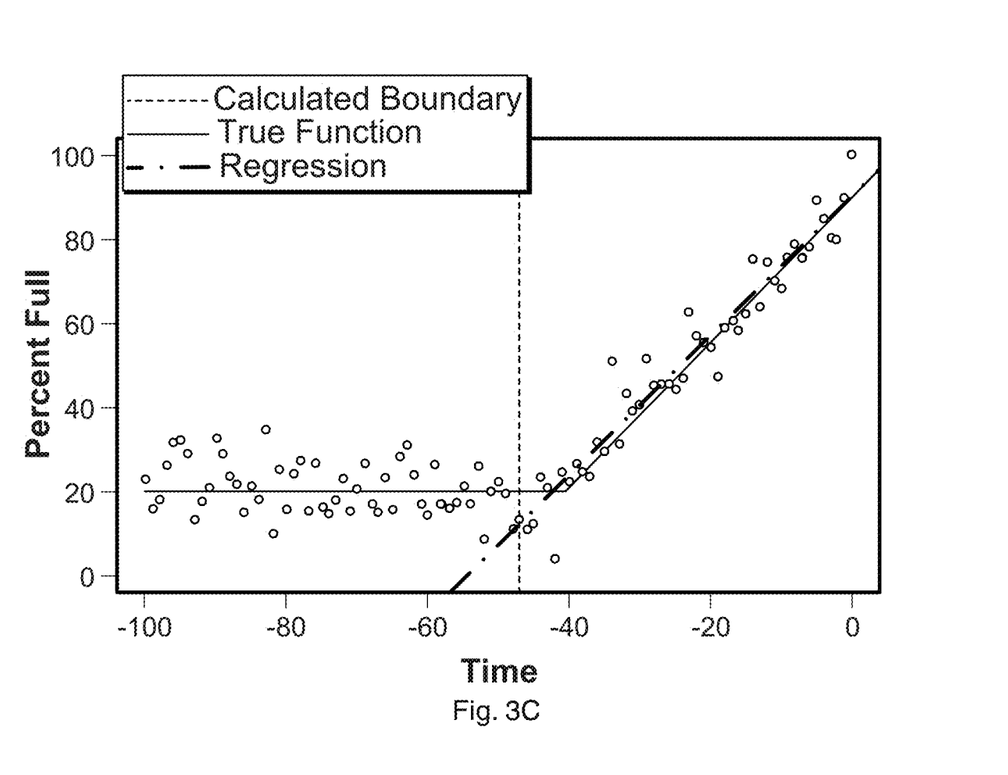
FIG. 3C is a diagram illustrating an embodiment of a linear regression.

FIG. 3C is a diagram illustrating an embodiment of a linear regression. In the example shown, the diagram of FIG. 3C shows a set of used capacities (e.g., used capacities of capacity data storage 204 of FIG. 2). In some embodiments, capacities represent the used capacities of a data storage (e.g., data storage 202 of FIG. 2). In some embodiments, used capacities shown in the diagram of FIG. 3B are the same used capacities shown in the diagram of FIG. 3A. In the example shown, the capacities of FIG. 3C exhibit a noisy piecewise linear behavior. In the example shown, the true function exhibits a slope of approximately 0 percent full per time unit over the time period marked −100 to −40, and a slope of approximately 2 percent full per time unit over the time period marked −40 to 0.

FIG. 3C additionally shows a linear regression over a subset of the used capacity data and the calculated boundary. In the example shown, the linear regression is computed over the period to the right of the calculated boundary, e.g., over the period −47 to 0. In the example shown, the data set exhibits piecewise linear behavior over the time period −100 to 0, with a change in slope at time −40, and thus a linear regression over the interval to the right of the calculated boundary is a good fit for the data to the right of the calculated boundary (e.g., the most recent data) and a poor fit for the data to the left of the calculated boundary (e.g., older data). In the example shown, the linear regression shows a very similar slope to the true function at time equals zero (e.g., present time), thus it is a good predictor of when the capacity will be exhausted (e.g., percent full reaches 100). The time when the capacity will be exhausted can be determined by extrapolating the line of the linear regression to 100 percent full and reading off the associated time.

Figure 3D:
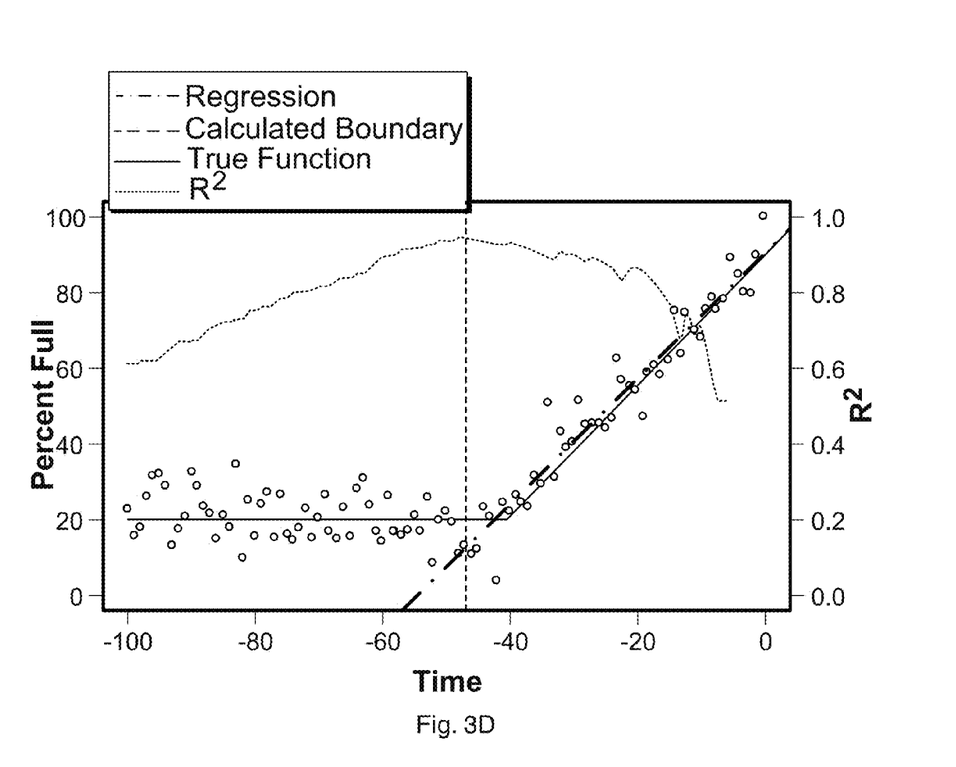
FIG. 3D is a diagram illustrating an embodiment of a calculated boundary.

FIG. 3D is a diagram illustrating an embodiment of a calculated boundary. In the example shown, the diagram of FIG. 3D shows a set of used capacities (e.g., used capacities of stored data in data storage 204 of FIG. 2). In some embodiments, capacities represent the used capacities of a data storage (e.g., data storage 202 of FIG. 2). In some embodiments, used capacities shown in the diagram of FIG. 3D are the same capacities shown in the diagram of FIG. 3A. In some embodiments, capacities shown in the diagram of FIG. 3D are the same capacities shown in the diagram of FIG. 3C. In the example shown, the used capacities of FIG. 3D exhibit a noisy piecewise linear behavior. In the example shown, the true function exhibits a slope of approximately 0 percent full per time unit over the time period marked −100 to −40, and a slope of approximately 2 percent full per time unit over the time period marked −40 to 0.

FIG. 3D additionally shows a set of R squared values and a calculated boundary. In the example shown, the R squared values represent R squared values associated with linear regression calculations. In some embodiments, the R squared value represents the fitting accuracy of a linear regression calculation. In some embodiments, an R squared value of 1 indicates a perfect fit between the linear regression and the data it is calculated over (e.g., the data is perfectly linear). In some embodiments, an R squared value over 0.9 is considered to be a good fit. In the example shown, an R squared value plotted associated with a given time represents the R squared value associated with the linear regression calculated on the subset of the set of capacities between that time and the current. For example, the R squared value drawn at time equals −40 indicates the R squared value calculated on the set of capacities from time equals −40 to time equals zero.

In some embodiments, the calculated boundary is determined to be the point in time associated with the maximum value of R squared. In the example shown, the calculated boundary is determined to be at time equals −47. In some embodiments, choosing the calculated boundary at the time associated with the maximum value of R squared produces a linear regression that is a good fit for the data between the calculated boundary and the current time. In some embodiments, choosing the calculated boundary at the time associated with the maximum value of R squared produces a linear regression that is a good predictor of when the capacity will be exhausted.

In some embodiments, the calculated boundary is selected at a time associated with a first local maximum when including data going backward in time from the current time. For example, the used capacities are included in the linear regression progressively going backwards in time. When the R squared of the linear regression reaches a maximum (e.g., a global maximum), then the boundary is selected. The linear regression results are used to predict a date of full capacity. In some embodiments, the prediction is subject to other conditions to determine whether the prediction is valid. In various embodiments, the maximum comprises a local maximum, a first maximum reached, a global maximum, or any other appropriate maximum.

Figure 4:
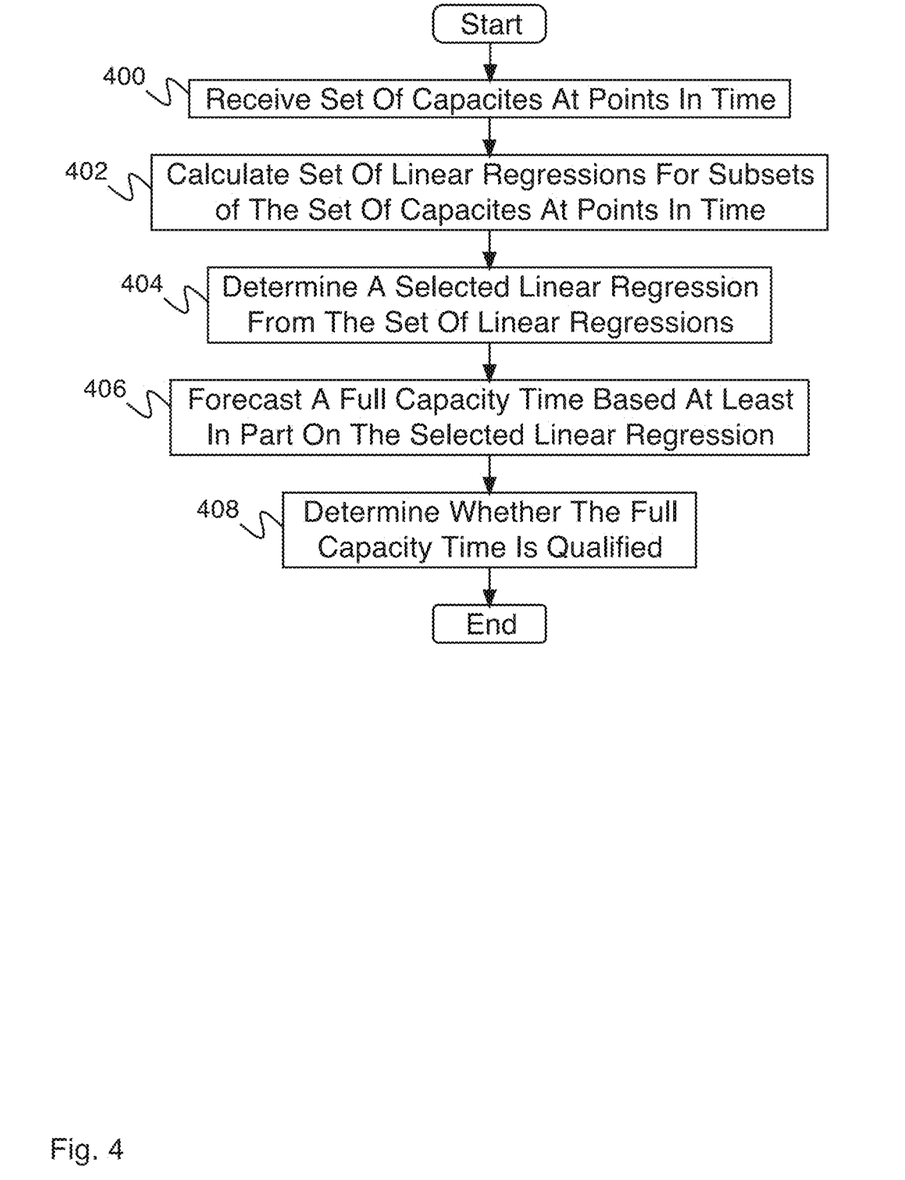
FIG. 4 is a flow diagram illustrating an embodiment of a process for capacity forecasting.

FIG. 4 is a flow diagram illustrating an embodiment of a process for capacity forecasting. In some embodiments, the process of FIG. 4 is executed by a capacity forecaster (e.g., capacity forecaster 206 of FIG. 2) for forecasting the capacity of a data storage (e.g., data storage 202 of FIG. 2). In the example shown, in 400, a set of capacities at points in time is received. In some embodiments, a set of used capacities at points in time is received from a capacity data storage (e.g., capacity data storage 204 of FIG. 2). In some embodiments, the set of capacities describes the capacity of a data storage at various points in time. In some embodiments, the capacity points are filtered (e.g., a moving average of the raw capacity points over time). In 402, a set of linear regressions is calculated for subsets of the set of capacities at points in time. In some embodiments, calculating a set of linear regressions for subsets of a set of capacities at points in time additionally comprises calculating R squared for each linear regression of the set of linear regressions. In some embodiments, the set of linear regressions is calculated over all subsets of the set of capacities at points in time that extend to the current time. In some embodiments, subsets comprise differently sized sets of capacities extending into the past from the current time. In 404, a selected linear regression is determined from the set of linear regressions. In some embodiments, determining a selected linear regression comprises calculating R squared values associated with each linear regression of the set of linear regressions. In some embodiments, the set of R squared values shown in FIG. 3C comprises a set of R squared values as in the set of R squared values associated with each linear regression of the set of linear regressions. In some embodiments, determining a selected linear regression from the set of linear regressions comprises selecting the linear regression associated with a maximum value of R squared. In 406, a full capacity time is forecast based at least in part on the selected linear regression. In some embodiments, forecasting a full capacity time comprises extrapolating the selected linear regression to the point where full capacity is reached and determining the time associated with the full capacity. In some embodiments, the date of full capacity is derived using the formula $x=(y-\alpha)/\beta$, where y is capacity, $\alpha$ is the intercept term, $\beta$ is the slope, and x is the date.

In 408, it is determined whether the full capacity time is qualified. In various embodiments, determining whether the full capacity time is qualified comprises determining whether the peak value of R squared is greater than a predetermined threshold (e.g., a value of 0.9), determining whether the selected linear regression has a positive slope, determining whether the full capacity time is less than N years (e.g., 2, 5, 7, 10 years, etc.) in the future, determining whether the points in time comprise at least M days (e.g., 2, 5, 10, 15 days of used capacities data, etc.), determining whether the points in time comprise a minimum of P data points, determining whether each capacity of the set of capacities comprises at least L percentage capacity used (e.g., 5%, 10%, 20%, 25% used, etc.), determining whether the capacity at the current point in time falls close to the selected linear regression, determining whether the most recent one or more capacity points falls close to the selected linear regression (e.g., 1, 2, 3, 4, 5, 6, 7 most recent points, etc.), or determining any other appropriate full capacity time qualification criteria.

Figure 5:
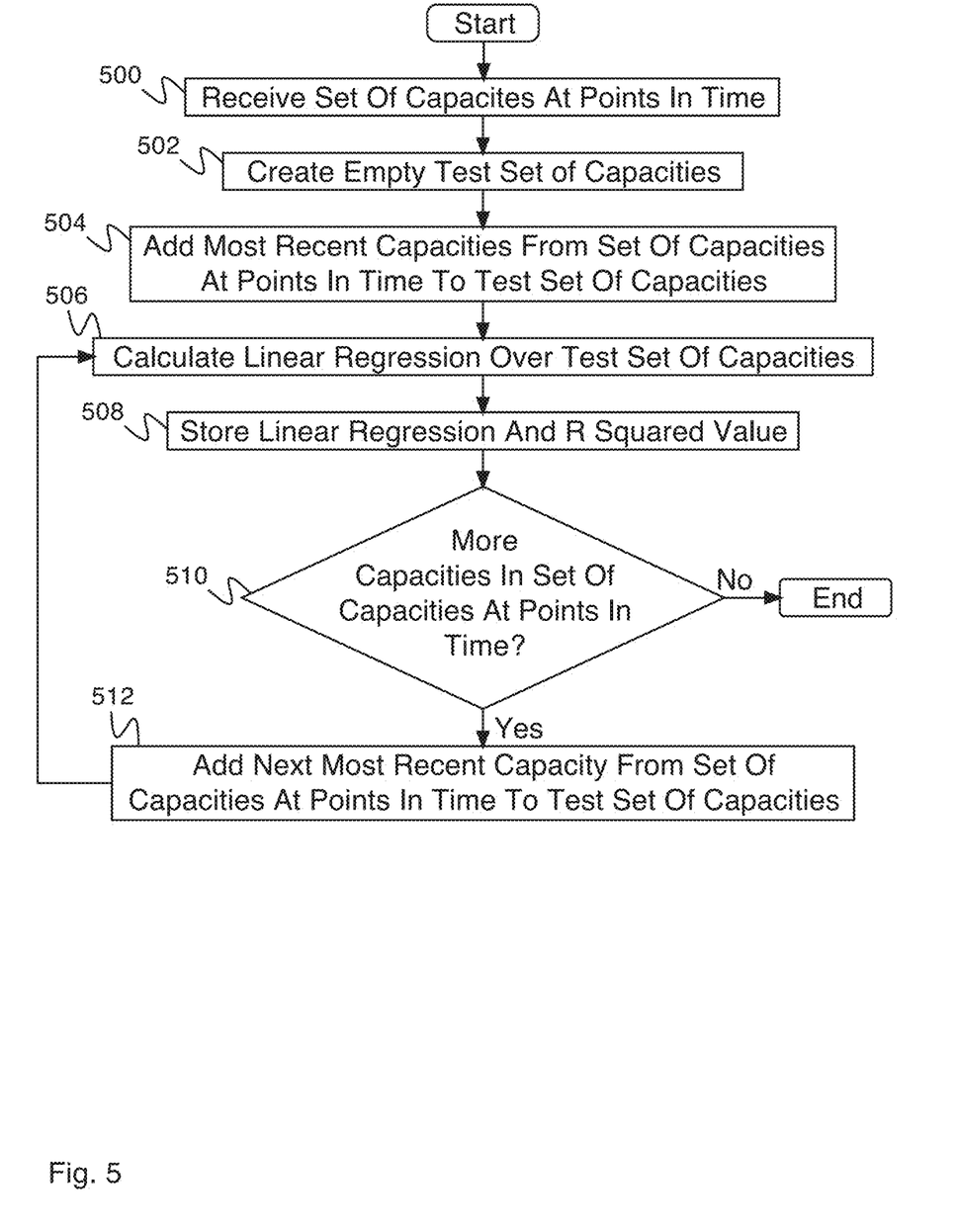
FIG. 5 is a flow diagram illustrating an embodiment of a process for calculating a set of linear regressions for subsets of a set of capacities at points in time.

FIG. 5 is a flow diagram illustrating an embodiment of a process for calculating a set of linear regressions for subsets of a set of capacities at points in time. In some embodiments, the process of FIG. 5 implements 402 of FIG. 4. In the example shown, in 500, a set of capacities at points in time is received (e.g., a set of capacities at points in time as in capacities at points in time stored by capacity data storage 204 of FIG. 2). In some embodiments, the set of capacities at points in time comprises the set of capacities at points in time received in 400 of FIG. 4. In 502, an empty test set of capacities is created. The test set of capacities will be used to store capacities at points in time to perform a linear regression on. In some embodiments, a data structure is created (e.g., with size zero) and then later loaded with capacities. In 504, the most recent capacities from the set of capacities at points in time are added to the test set of capacities. In some embodiments, there are a minimum useful number of capacity data points to perform a linear regression on, and that minimum useful number is added to the test set of capacities. In various embodiments, 1, 2, 3, 5, 8, 10, 15, 20, or any other appropriate number of most recent capacities from the set of capacities at points in time is added to the test set of capacities. In 506, a linear regression is calculated over the test set of capacities. In some embodiments, the output of a linear regression calculation comprises a linear regression (e.g., a mathematical description of a line such as a slope and intercept) and an R squared value. In 508, the linear regression and the R squared value are stored. In 510 it is determined if there are more capacities in the set of capacities at points in time. If there are no more capacities in the set of capacities at points in time, the process ends. If there are more capacities in the set of capacities at points in time, control passes to 512. In 512, the next most recent capacity data point from the set of capacities at points in time is added to the test set of capacities. In some embodiments, the most recent set of two or more capacities is added. Control then passes to 506.

Figure 6:
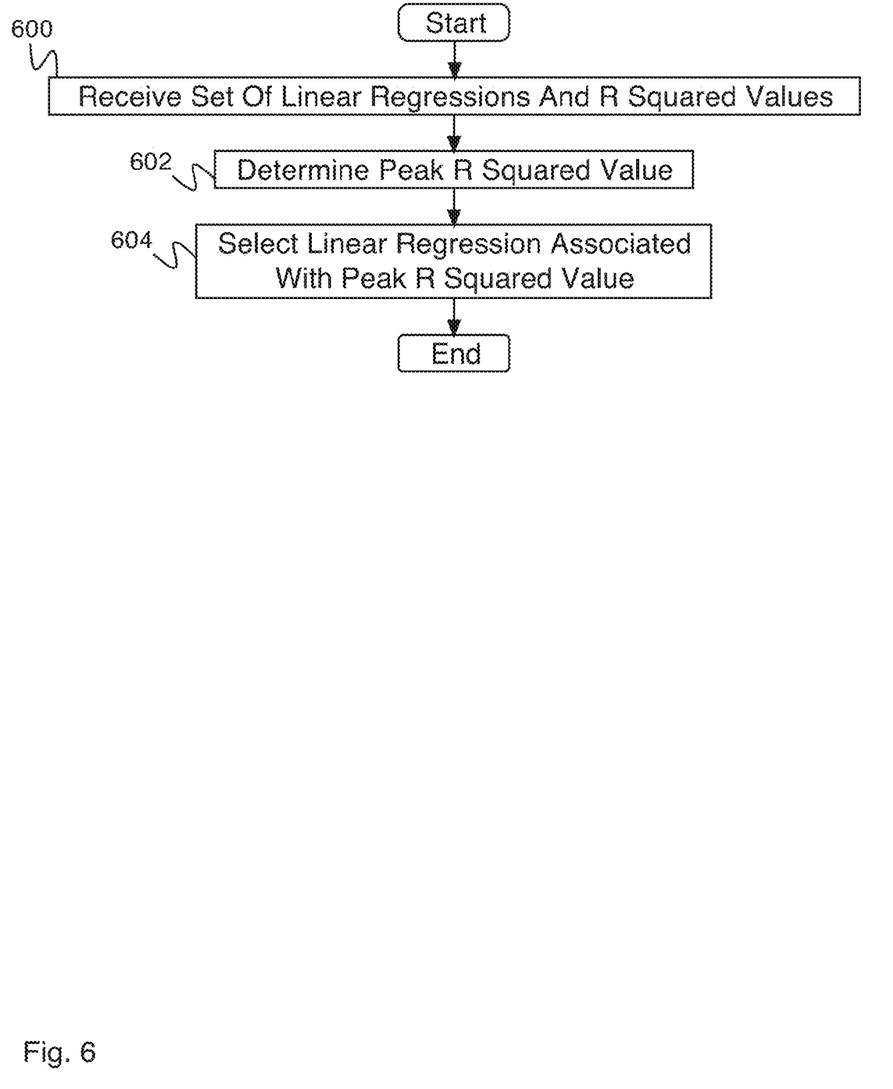
FIG. 6 is a flow diagram illustrating an embodiment of a process for determining a selected linear regression from a set of linear regressions.

FIG. 6 is a flow diagram illustrating an embodiment of a process for determining a selected linear regression from a set of linear regressions. In some embodiments, the process of FIG. 6 implements 404 of FIG. 4. In the example shown, in 600, a set of linear regressions and R squared values is received. In some embodiments the set of linear regressions and R squared values comprises the set of linear regressions and R squared values calculated in 402 of FIG. 4. In 602, the peak R squared value is determined. In some embodiments, the peak R squared value is determined by examining all of the R squared values received and determining the largest. In 604, the linear regression associated with the peak R squared value is selected.

Figure 7:
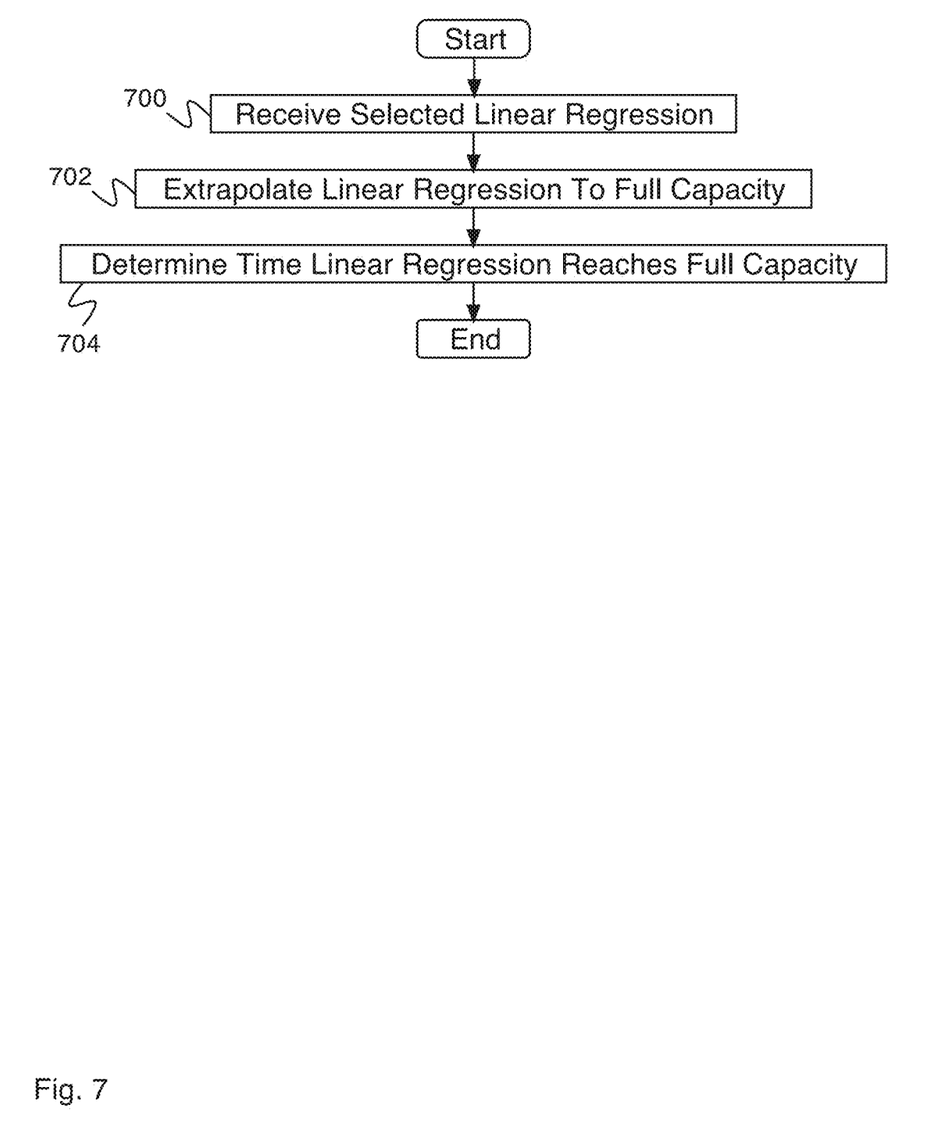
FIG. 7 is a flow diagram illustrating an embodiment of a process for forecasting a full capacity time based at least in part on a selected linear regression.

FIG. 7 is a flow diagram illustrating an embodiment of a process for forecasting a full capacity time based at least in part on a selected linear regression. In some embodiments, the process of FIG. 7 implements 406 of FIG. 4. In the example shown, in 700, a selected linear regression is received. In some embodiments, the selected linear regression received comprises the linear regression selected in 404 of FIG. 4. In 702, the linear regression is extrapolated to full capacity. In some embodiments, extrapolating the linear regression to full capacity comprises dividing a full capacity value (e.g., capacity equals 1) by the linear regression slope (e.g., a value in units of capacity per unit time). In 704, the time the linear regression reaches full capacity is determined. For example, the time, date, or time interval is determined when the linear regression reaches full capacity. In some embodiments, determining the time the linear regression reaches full capacity comprises adding the quotient determined in 702 (e.g., the total time taken to go from zero capacity used to 100 percent capacity used) to the linear regression x-intercept value (e.g., the time at which the linear regression crosses zero capacity used).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capacity forecasting, comprising:
a processor configured to:
   determine a selected statistical analysis from a set of statistical analyses for subsets of a set of capacities at points in time;
   calculate a set of linear regressions for subsets of a set of capacities at points in time additionally comprises calculating R squared for each linear regression of the set of linear regressions;
   forecast a full capacity time based at least in part on the selected statistical analysis; and
   determine that the full capacity time is qualified, wherein determining whether the full capacity time is qualified comprises determining whether a peak value of R squared is greater than a predetermined threshold, and wherein determining comprises selecting a linear regression associated with a first local maximum value of R squared; and
a memory coupled to the processor and configured to provide the processor with instructions.

2. A system as in claim 1, wherein the set of capacities at points in time comprise a set of capacities that are moving averages of raw capacities over time.

3. A system as in claim 1, wherein the processor is further configured to receive a set of capacities at points in time.

4. A system as in claim 1, wherein the capacities comprise deduplicating system capacities.

5. A system as in claim 1, wherein the subsets comprise differently sized sets of capacities extending into the past from a current time.

6. A system as in claim 1, wherein determining comprises selecting the linear regression associated with the peak value of R squared.

7. A system as in claim 1, wherein the predetermined threshold comprises 0.9.

8. A system as in claim 1, wherein determining that the full capacity time is qualified comprises determining that the selected linear regression has a positive slope.

9. A system as in claim 1, wherein determining that the full capacity time is qualified comprises determining that the full capacity time is less than N years in the future.

10. A system as in claim 1, wherein determining that the full capacity time is qualified comprises determining that the points in time comprise at least M days.

11. A system as in claim 1, wherein determining that the full capacity time is qualified comprises determining that the points in time comprise at least P data points.

12. A system as in claim 1, wherein determining that the full capacity time is qualified comprises determining that each capacity of the set of capacities indicates at least L percentage used.

13. A system as in claim 1, wherein determining that the full capacity time is qualified comprises determining that a most recent one or more capacity points falls close to the selected linear regression.

14. A system as in claim 13, wherein the most recent one or more capacity points comprises the most recent one capacity point.

15. A method for capacity forecasting comprising:
   determining, using a processor, a selected statistical analysis from a set of statistical analyses for subsets of a set of capacities at points in time;
   calculating a set of linear regressions for subsets of a set of capacities at points in time additionally comprises calculating R squared for each linear regression of the set of linear regressions;
   forecasting a full capacity time based at least in part on the selected statistical analysis; and
   determining that the full capacity time is qualified, wherein determining whether the full capacity time is qualified comprises determining whether a peak value of R squared is greater than a predetermined threshold, and wherein determining comprises selecting a linear regression associated with a first local maximum value of R squared.

16. A computer program product for capacity forecasting, the computer program product being embedded in a non-transitory computer readable storage medium and comprising computer instructions for:
   determining a selected statistical analysis from a set of statistical analyses for subsets of a set of capacities at points in time;
   calculating a set of linear regressions for subsets of a set of capacities at points in time additionally comprises calculating R squared for each linear regression of the set of linear regressions;
   forecasting a full capacity time based at least in part on the selected statistical analysis; and
   determining that the full capacity time is qualified, wherein determining whether the full capacity time is qualified comprises determining whether a peak value of R squared is greater than a predetermined threshold, and wherein determining comprises selecting a linear regression associated with a first local maximum value of R squared.

* * * * *